(12) United States Patent
Kataoka et al.

(10) Patent No.: US 10,895,346 B2
(45) Date of Patent: Jan. 19, 2021

(54) PRESSURE VESSEL

(71) Applicant: Kobe Steel, Ltd., Hyogo (JP)

(72) Inventors: Yasuto Kataoka, Kobe (JP); Kazuya Hirata, Harima-cho (JP); Koji Hagihara, Harima-cho (JP)

(73) Assignee: Kobe Steel, Ltd., Hyogo (JP)

( * ) Notice: Subject to any disclaimer, the term of this patent is extended or adjusted under 35 U.S.C. 154(b) by 117 days.

(21) Appl. No.: 15/125,904

(22) PCT Filed: Feb. 26, 2015

(86) PCT No.: PCT/JP2015/055532
§ 371 (c)(1),
(2) Date: Sep. 13, 2016

(87) PCT Pub. No.: WO2015/156049
PCT Pub. Date: Oct. 15, 2015

(65) Prior Publication Data
US 2016/0377229 A1 Dec. 29, 2016

(30) Foreign Application Priority Data
Apr. 9, 2014 (JP) .................................. 2014-079873

(51) Int. Cl.
*F17C 1/08* (2006.01)
*F17C 1/00* (2006.01)
(Continued)

(52) U.S. Cl.
CPC ............... *F17C 1/08* (2013.01); *F04B 25/00* (2013.01); *F04B 39/06* (2013.01); *F04B 41/02* (2013.01);
(Continued)

(58) Field of Classification Search
CPC ............... F17C 1/08; F17C 2201/0166; F17C 2203/012
(Continued)

(56) References Cited

U.S. PATENT DOCUMENTS 664,421 A * 12/1900 Manning ....................... 220/4.12
4,297,846 A * 11/1981 Cadeddu .................. B62J 35/00
137/262
(Continued)

FOREIGN PATENT DOCUMENTS

| JP | H02-124367 U | 10/1990 |
| JP | 2004-091654 A | 3/2004 |

(Continued)

OTHER PUBLICATIONS

Notification of Concerning Transmittal of International Preliminary Report on Patentability and Translation of Written Opinion of the International Searching Authority; PCT/JP2015/055532 dated Oct. 20, 2016.
(Continued)

*Primary Examiner* — Anthony D Stashick
*Assistant Examiner* — Raven Collins
(74) *Attorney, Agent, or Firm* — Studebaker & Brackett PC

(57) ABSTRACT

A pressure vessel, comprising: a vessel body having a rectangular parallelepiped shape for containing high pressure gas; a dividing wall in the form of a plate and disposed in the vessel body; and a plurality of ribs disposed on an outer surface of the vessel body. The vessel body includes: a top wall having a rectangular shape; a bottom wall having a rectangular shape and facing the top wall; and a surrounding wall joining a peripheral edge of the top wall and a peripheral edge of the bottom wall. The dividing wall is disposed in the vessel body to define a first chamber having
(Continued)

a rectangular parallelepiped shape and a second chamber having a rectangular parallelepiped shape in cooperation with the vessel body. Each of the plurality of ribs extends over an entire circumference of the vessel body and along a plane perpendicularly intersecting the dividing wall.

7 Claims, 9 Drawing Sheets

(51) Int. Cl.

| | | |
|---|---|---|
| F28D 9/00 | (2006.01) | |
| F16J 12/00 | (2006.01) | |
| F04B 41/02 | (2006.01) | |
| F17C 5/00 | (2006.01) | |
| F04B 39/06 | (2006.01) | |
| F04B 25/00 | (2006.01) | |
| F04B 53/08 | (2006.01) | |
| F25B 1/10 | (2006.01) | |

(52) U.S. Cl.
CPC ............ *F04B 53/08* (2013.01); *F16J 12/00* (2013.01); *F17C 1/00* (2013.01); *F17C 5/00* (2013.01); *F28D 9/0006* (2013.01); *F28D 9/0093* (2013.01); *F17C 2201/0166* (2013.01); *F17C 2203/012* (2013.01); *F25B 1/10* (2013.01); *F25B 2400/072* (2013.01); *F25B 2500/18* (2013.01)

(58) Field of Classification Search
USPC .......................................... 220/592; 222/173
See application file for complete search history.

(56) References Cited

U.S. PATENT DOCUMENTS

| | | | | |
|---|---|---|---|---|
| 6,595,382 | B2* | 7/2003 | Ettlinger ................... | F17C 1/08 |
| | | | | 220/560.1 |
| 2001/0002023 | A1* | 5/2001 | Stradinger .............. | E03F 1/006 |
| | | | | 220/584 |
| 2007/0194051 | A1* | 8/2007 | Bakken ..................... | F17C 1/08 |
| | | | | 222/173 |
| 2013/0048646 | A1* | 2/2013 | Kataoka ................... | F17C 1/02 |
| | | | | 220/581 |
| 2015/0090727 | A1* | 4/2015 | Kataoka ................... | F17C 1/02 |
| | | | | 220/592 |
| 2015/0114974 | A1 | 4/2015 | Kataoka | |
| 2016/0167279 | A1* | 6/2016 | Besson ............... | B29C 49/0005 |
| | | | | 426/590 |

FOREIGN PATENT DOCUMENTS

| | | |
|---|---|---|
| JP | 2013-044388 A | 3/2013 |
| JP | 2014-001830 A | 1/2014 |
| JP | 2014-001831 A | 1/2014 |
| JP | 2014-001832 A | 1/2014 |
| WO | 01/75354 A1 | 10/2001 |
| WO | 2013/008719 A1 | 1/2013 |

OTHER PUBLICATIONS

International Search Report issued in PCT/JP2015/055532; dated May 26, 2015.

\* cited by examiner

US 10,895,346 B2

PRESSURE VESSEL

TECHNICAL FIELD

The present invention relates to a pressure vessel for use in, for example, a gas cooler for cooling compressed gas.

BACKGROUND ART

Conventionally, pressure vessels (gas coolers) for cooling high pressure gas are known. For example, Patent Literature 1 discloses a pressure vessel which includes a vessel body having a rectangular parallelepiped shape and adapted for containing high pressure gas, a dividing wall in the form of a plate and disposed in the vessel body in such a way as to divide the internal space of the vessel body in half, and a plurality of ribs disposed on an outer surface of the vessel body. The vessel body includes a top wall body having a rectangular shape, a bottom wall body having a rectangular shape and facing the top wall body, and a surrounding wall in the form of a rectangular tube and joining a peripheral edge of the top wall body and a peripheral edge of the bottom wall body. The dividing wall is disposed in the vessel body in such a way as to define a first chamber having a rectangular parallelepiped shape and a second chamber having a rectangular parallelepiped shape in cooperation with the vessel body. Specifically, the dividing wall extends in a direction perpendicularly intersecting the top wall body and the bottom wall body and joins an inner surface of the top wall body and an inner surface of the bottom wall body. The plurality of ribs are disposed on an outer surface of the top wall body and an outer surface of the bottom wall body. On the outer surface of the top wall body, there are disposed a plurality of transverse ribs each extending in a transverse direction of the top wall body (a direction in parallel to the dividing wall) and along a plane extending in parallel to the dividing wall, and a plurality of longitudinal ribs each extending in a longitudinal direction of the top wall body (a direction perpendicularly intersecting the dividing wall) and along a plane perpendicularly intersecting the dividing wall. Similarly, on the outer surface of the bottom wall body, there are disposed a plurality of transverse ribs each extending in a transverse direction of the bottom wall body and along a plane extending in parallel to the dividing wall, and a plurality of longitudinal ribs each extending in a longitudinal direction of the bottom wall body and along a plane perpendicularly intersecting the dividing wall.

The vessel body has a tendency that, upon application of internal pressure to the vessel body by introduction of high pressure gas into each chamber of the pressure vessel, respective flat portions of the top wall body and the bottom wall body that exclude the portions joining the dividing wall mainly expand and deform outward. The deformation is suppressed by the plurality of ribs.

In the pressure vessel of Patent Literature 1, a desired strength is secured while avoiding a great weight increase by reinforcing the relatively easily deformable portions of the top wall body and the bottom wall body by the plurality of ribs. However, further weight reduction is demanded for such a pressure vessel.

CITATION LIST

Patent Literature

Patent Literature 1: Japanese Unexamined Patent Publication No. 2014-001830

SUMMARY OF INVENTION

An object of the present invention is to provide a pressure vessel that allows further weight reduction while securing a desired strength.

In order to achieve the above-mentioned object, the present inventors paid attention to the stress distribution of pressure vessels such as ones disclosed in Patent Literature 1 (which include a vessel body having a rectangular parallelepiped shape, a dividing wall in the form of a plate, ribs each extending in parallel to the dividing wall and along a plane extending in parallel to the dividing wall, and ribs each extending in a direction perpendicularly intersecting the dividing wall and along a plane perpendicularly intersecting the dividing wall). As a result of analysis of the stress distribution, the present inventors found that in such a pressure vessel, upon application of internal pressure, the maximum stress occurs in joining portions of the top wall and the surrounding wall and of the bottom wall and the surrounding wall, and the second maximum stress occurs in a vertically middle portion of the surrounding wall.

Further, the present inventors found that in such a pressure vessel, a rib disposed along a plane perpendicularly intersecting the dividing wall provides a relatively greater reinforcing effect of the vessel body (reducing effect of the stress that occurs in the vessel body with respect to the weight of the rib) than a rib disposed along a plane extending in parallel to the dividing wall.

A pressure vessel according to an aspect of the present invention comprises: a vessel body having a rectangular parallelepiped shape and adapted for containing high pressure gas; a dividing wall in the form of a plate and disposed in the vessel body; and a plurality of ribs disposed on an outer surface of the vessel body, wherein: the vessel body includes a top wall having a rectangular shape, a bottom wall having a rectangular shape and facing the top wall, and a surrounding wall in the form of a rectangular tube and joining a peripheral edge of the top wall and a peripheral edge of the bottom wall; the dividing wall is disposed in the vessel body in such a way as to define a first chamber having a rectangular parallelepiped shape and a second chamber having a rectangular parallelepiped shape in cooperation with the vessel body; and each of the plurality of ribs extends over an entire circumference of the vessel body and along a plane perpendicularly intersecting the dividing wall.

DESCRIPTION OF EMBODIMENTS

Hereinafter, preferred embodiments of the present invention will be described with reference to the accompanying drawings.

First Embodiment

A first embodiment of the present invention will be described with reference to FIGS. 1 to 12.

Figure 1:
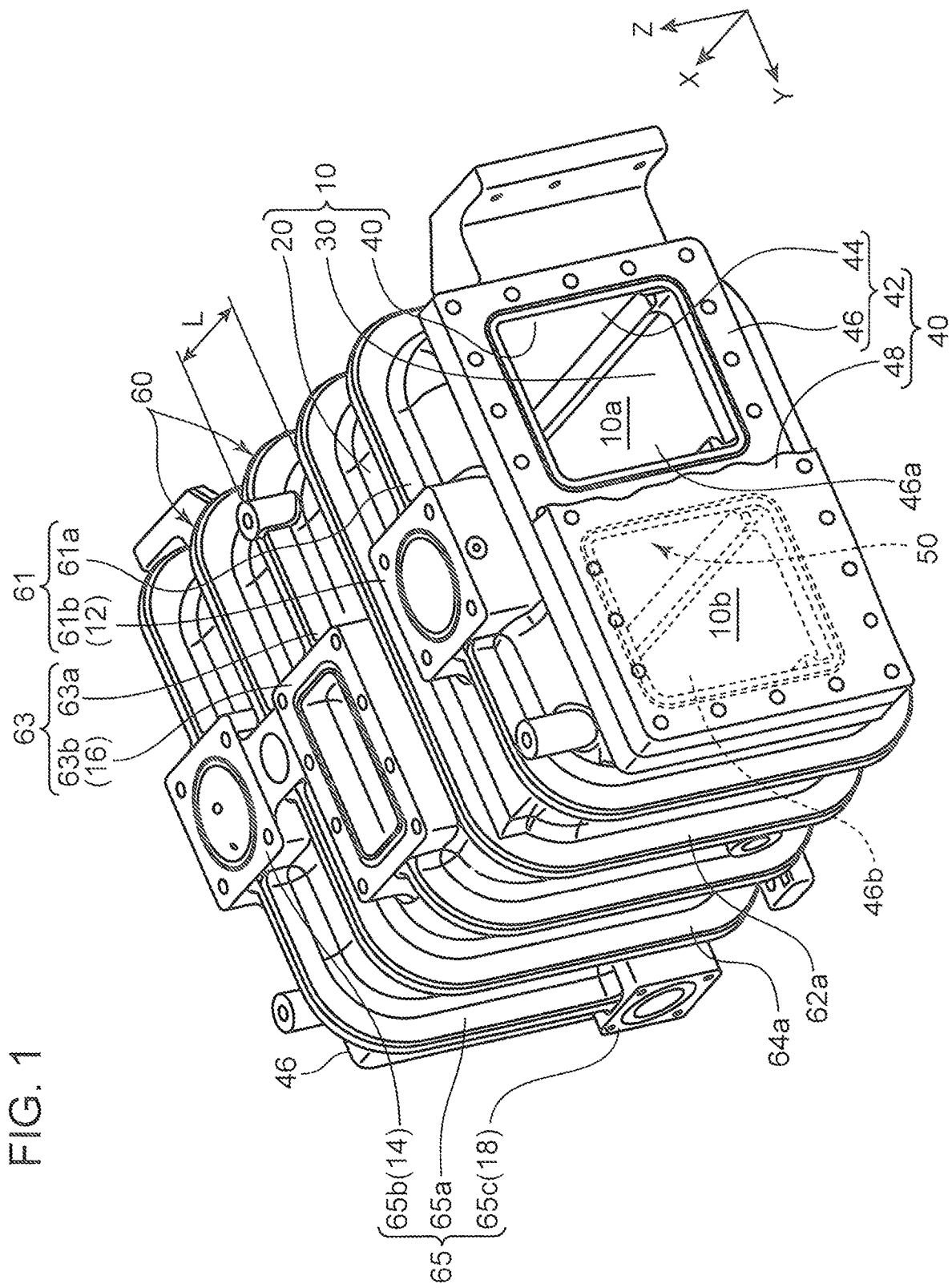
FIG. 1 is a perspective view of a pressure vessel according to a first embodiment of the present invention.
Figure 2:
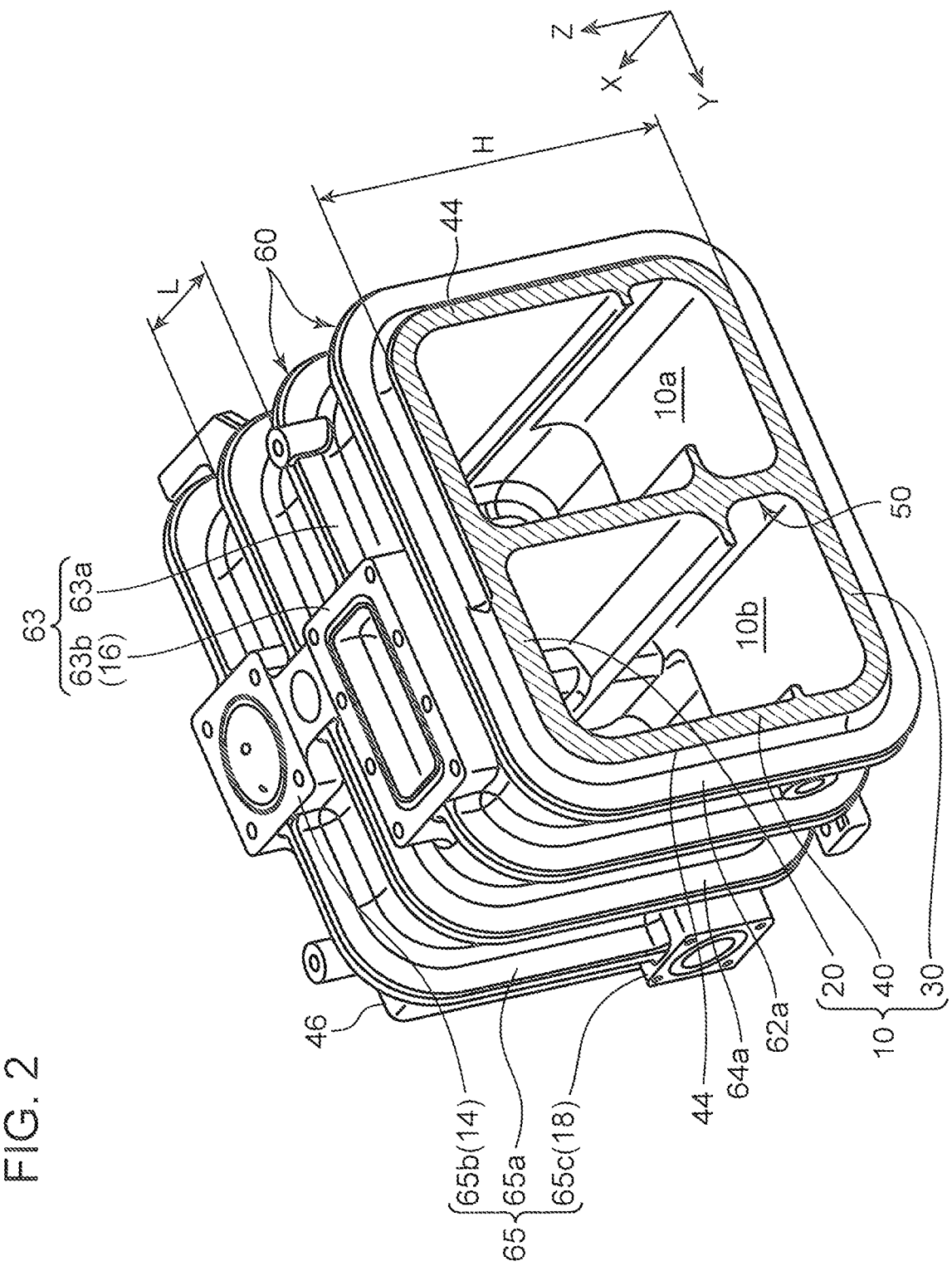
FIG. 2 is a sectional perspective view of the pressure vessel shown in FIG. 1.
Figure 3:
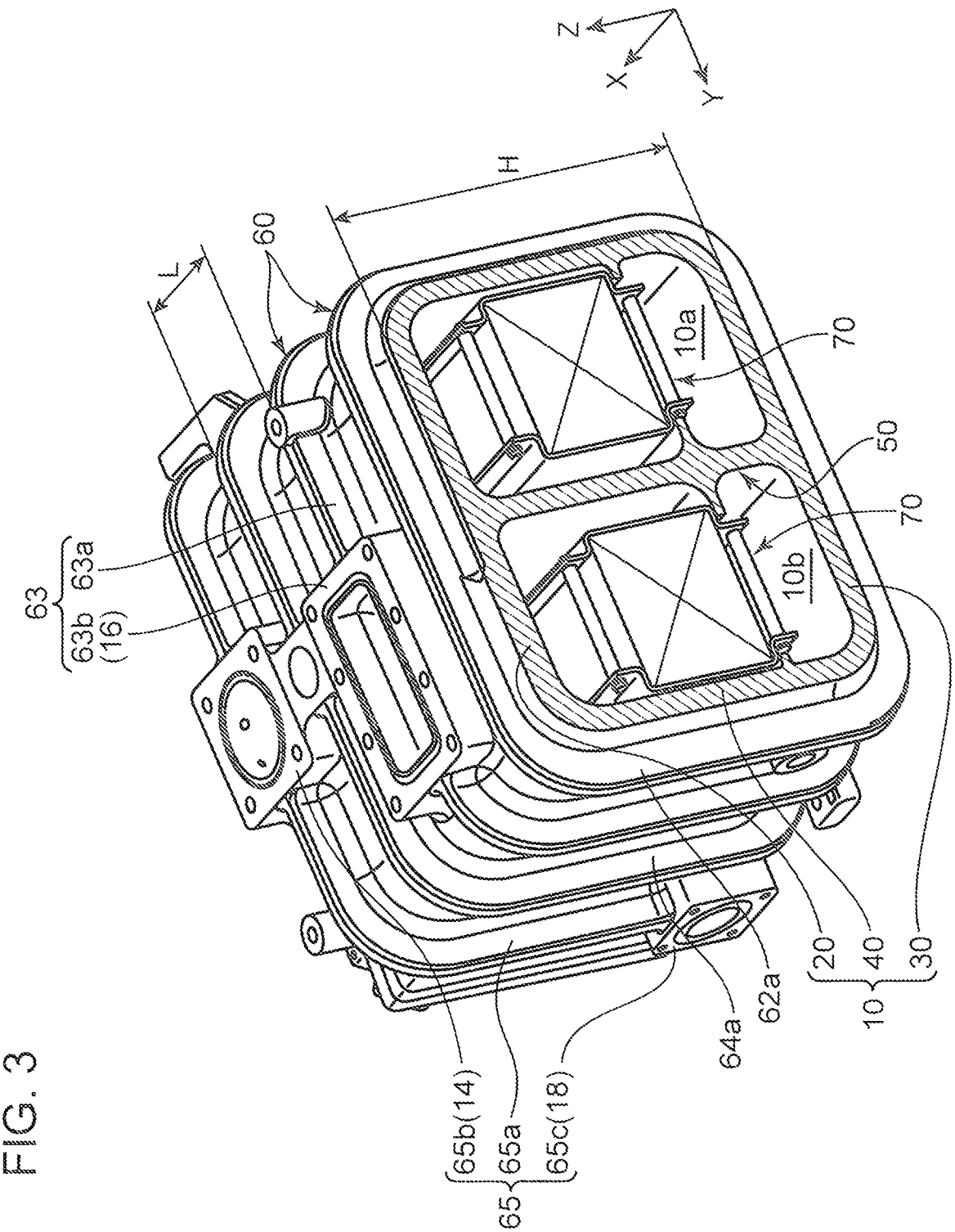
FIG. 3 is a sectional perspective view of the pressure vessel shown in FIG. 1 with heat exchangers placed therein.

As shown in FIGS. 1 to 3, a pressure vessel according to the first embodiment includes a vessel body 10 having a rectangular parallelepiped shape and adapted for containing high pressure gas, a dividing wall 50 in the form of a plate and disposed in the vessel body 10, and a plurality of ribs 60 disposed on an outer surface of the vessel body 10. The dividing wall 50 is disposed in the vessel body 10 in such a way as to divide the internal space of the vessel body 10 in half. Specifically, the dividing wall 50 is disposed in the vessel body 10 in such a way as to define a first chamber 10a having a rectangular parallelepiped shape and a second chamber 10b having a rectangular parallelepiped shape in cooperation with the vessel body 10. The dividing wall 50 and the plurality of ribs 60 are integrally molded with the vessel body 10. For example, the pressure vessel is molded by casting.

Figure 4:
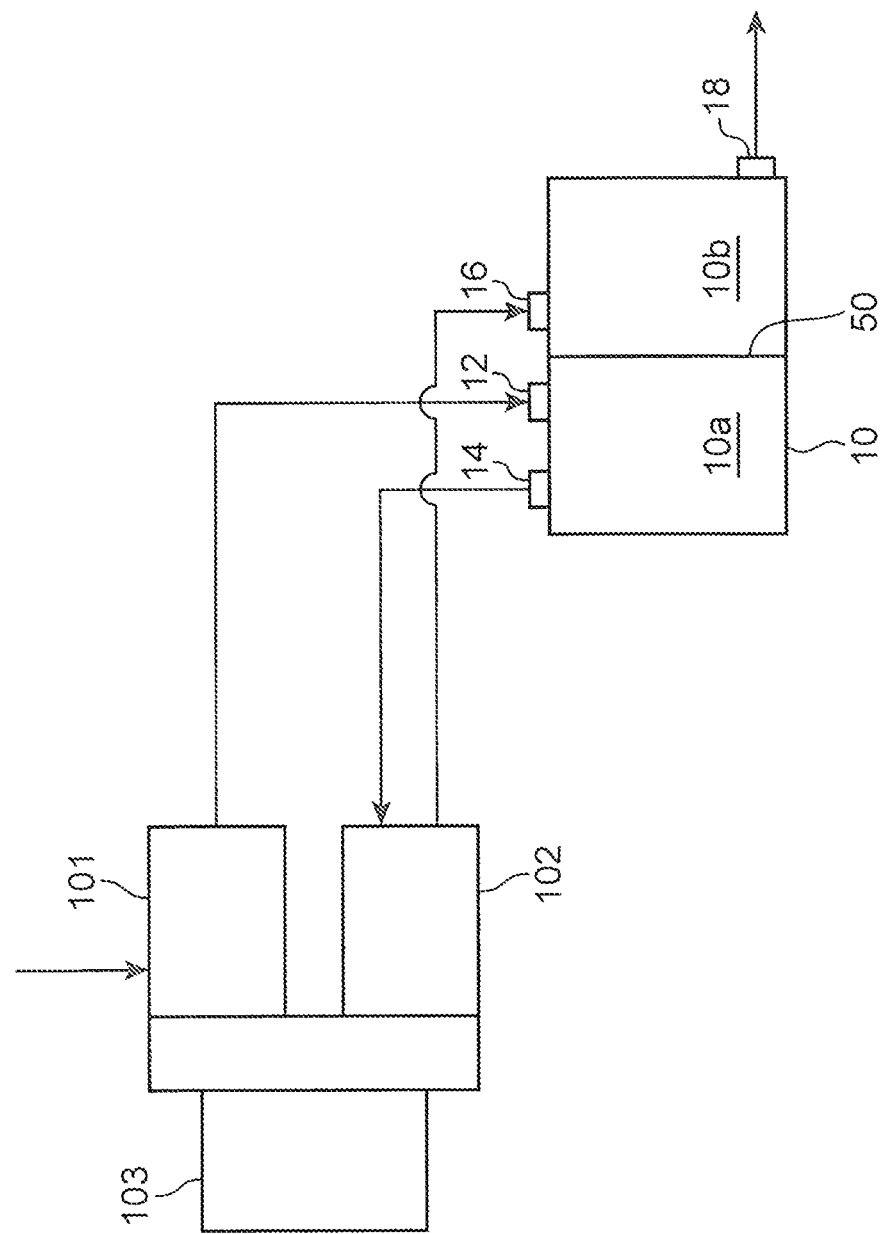
FIG. 4 is a schematic view of a compression device including the pressure vessel shown in FIG. 1.

The pressure vessel according to the first embodiment can be used for a compression device including a first compressor 101 and a second compressor 102, as shown in FIG. 4. In this case, the first chamber 10a of the pressure vessel is used as an intercooler for cooling high pressure gas compressed by the first compressor 101. The second chamber 10b is used as an aftercooler for cooling the high pressure gas flown out of the first chamber (intercooler) 10a and subsequently further compressed by the second compressor 102. The high pressure gas flown out of the first compressor 101 flows into the first chamber 10a through a first flow inlet 12 formed in an upper portion of the vessel body 10. The high pressure gas cooled in the first chamber 10a flows out through a first flow outlet 14 formed in the upper portion of the vessel body 10. The high pressure gas flown out of the second compressor 102 flows into the second chamber 10b through a second flow inlet 16 formed in the upper portion of the vessel body 10. The high pressure gas cooled in the second chamber 10b flows out through a second flow outlet 18 formed in a side portion of the vessel body 10. The first compressor 101 and the second compressor 102 are connected to a motor 103 via a gear.

Hereinafter, the pressure vessel according to the first embodiment will be described in detail.

As shown in FIGS. 1 to 3, the vessel body 10 includes a top wall 20 having a rectangular shape, a bottom wall 30 having a rectangular shape and facing the top wall 20, and a surrounding wall 40 in the form of a rectangular tube. In the first embodiment, the volume of the first chamber 10a and the volume of the second chamber 10b are substantially the same. Therefore, in the case that the pressure vessel is used as a gas cooler as described above, the internal pressure acting on the second chamber 10b is higher than the internal pressure acting on the first chamber 10a. It should be noted that the walls 20, 30 and 40 have the same thickness. Specifically, the thickness of the walls 20, 30 and 40 is so set as to provide rigidity sufficient to withstand the internal pressure acting on the second chamber 10b.

The top wall 20 is in the form of a plate. In the first embodiment, the top wall 20 has a rectangular shape having a longer dimension in one direction. Hereinafter, the longitudinal direction of top wall 20 will be referred to as "X-axis direction", the arrangement direction of the top wall 20 and the bottom wall 30 will be referred to as "Z-axis direction", and the direction perpendicularly intersecting both the X-axis direction and the Z-axis direction will be referred to as "Y-axis direction".

The bottom wall 30 is in the form of a plate. The bottom wall 30 has a rectangular shape having a longer dimension in the one direction (X-axis direction).

The surrounding wall 40 joins a peripheral edge of the top wall 20 and a peripheral edge of the bottom wall 30. Joining portions of the surrounding wall 40 and the top wall 20 and of the surrounding wall 40 and the bottom wall 30 each outwardly curve. In other words, the sides of the vessel body 10 outwardly curve at each joining portion. In the first embodiment, such shape of the vessel body 10 is referred to as "rectangular parallelepiped shape".

The surrounding wall 40 includes a surrounding wall body 42 integrally connecting with the top wall 20 and the bottom wall 30, and lid walls 48 detachably mounted on the surrounding wall body 42. It should be noted that FIG. 1 shows a lid wall 48 with a portion cut out.

The surrounding wall body 42 includes a pair of first facing walls 44 facing each other and each in the form of a plate, and a pair of second facing walls 46 facing each other and each in the form of a plate extending in a direction perpendicularly intersecting the first facing walls 44. In the first embodiment, each first facing wall 44 has a rectangular shape having a longer dimension in the longitudinal direction of the top wall 20 and the bottom wall 30 (X-axis direction). Each second facing wall 46 has a rectangular shape having a longer dimension in the direction (Y-axis direction) perpendicularly intersecting the first facing walls 44. The widthwise opposite ends (in the Y-axis direction) of each second facing wall 46 are respectively join the first facing walls 44. Each second facing wall 46 includes a first opening 46a and a second opening 46b passing therethrough in its thickness direction (X-axis direction). The openings 46a and 46b are adjacent to each other in the direction (Y-axis direction) in which the pair of first facing walls 44 face each other.

The lid walls 48 each have a shape to cover the first opening 46a and the second opening 46b. The lid wall 48 is secured to the second facing wall 46 by a fastener such as a bolt in such a way as to cover the first opening 46a and the second opening 46b.

The dividing wall 50 is in the form of a plate. The dividing wall 50 extends in the direction perpendicularly intersecting the top wall 20 and the bottom wall 30 and joins an inner surface of the top wall 20 and an inner surface of the bottom wall 30. The dividing wall 50 extends in parallel to the pair of first facing walls 44 and in the direction perpendicularly intersecting the pair of second facing walls 46, and joins a portion of an inner surface of each second facing wall 46 that lies between the first opening 46a and the second opening 46b. In the first embodiment, the dividing wall 50 has a rectangular shape having a longer dimension in the longitudinal direction of the top wall 20 and the bottom wall 30 (X-axis direction). The dividing wall 50 has the same thickness as the vessel body 10. However, the dividing wall 50 may be made to have a thickness smaller than the vessel body 10. Owing to the dividing wall 50, the first chamber 10a having a rectangular parallelepiped shape and the second chamber 10b having a rectangular parallelepiped shape are defined in the vessel body 10. In the first embodiment, the height (in the Z-axis direction) of the dividing wall 50 is so set that each of the chambers 10a, 10b has a height H (in the Z-axis direction) greater than its width (in the Y-axis direction). It should be noted that the height H of the vessel body 10 (each of the chambers 10a, 10b) is the measurement from the center of the top wall 20 in its plate thickness direction (Z-axis direction) to the center of the bottom wall 30 in its plate thickness direction (Z-axis direction).

As shown in FIG. 3, a heat exchanger 70 is placed in each of the first chamber 10a and the second chamber 10b, the heat exchangers being respectively adapted for cooling high pressure gas flown in the chambers 10a, 10b. Specifically, the heat exchangers 70 are placed into the chambers 10a, 10b through openings 46a, 46b, respectively, in a state where a lid wall 48 is detached. Thereafter, the lid wall 48 is attached to the corresponding second facing wall 46. Consequently, the chambers 10a, 10b are enclosed with the heat exchangers 70 respectively placed in the first chamber 10a and the second chamber 10b.

Each of the plurality of ribs 60 continuously extends over an entire circumference of the vessel body 10 along, not a plane (X-Z plane) extending in parallel to the dividing wall 50, but a plane (Y-Z plane) perpendicularly intersecting the dividing wall 50. The plurality of ribs 60 are arranged at regular intervals in the direction (X-axis direction) that perpendicularly intersects the plane perpendicularly intersecting the dividing wall 50. In the first embodiment, five ribs 60 are provided.

In the first embodiment, a first rib 61 positioned at one end of the plurality of ribs 60 includes a first rib body 61a continuously extending in the circumferential direction of the vessel body 10, and a first connection rib 61b which allows the first chamber 10a to communicate with the outside and connects one end and the other end of the first rib body 61a. The first rib body 61a joins a circumferential surface of the first connection rib 61b. Consequently, the first rib 61 as a whole continuously extends over the entire circumference of the vessel body 10. The first connection rib 61b includes the circumferential surface in the form of a rectangular tube and an inner surface in the form of a cylinder. The first connection rib 61b projects upward from an outer surface of the top wall 20. The first connection rib 61b has a flat top surface. The amount of projection of the first connection rib 61b from the outer surface of the top wall 20 is slightly greater than that of the first rib body 61a. An end of a pipe is connected to the top surface of the first connection rib 61b, the pipe being used for guiding gas discharged from the first compressor 101 or the like into the first chamber 10a. In other words, in the first embodiment, the first connection rib 61b functions as the first flow inlet 12. The first connection rib 61b reinforces the vessel body 10, similarly to the first rib body 61a. Therefore, in the first embodiment, the first rib 61 including the first connection rib 61b is regarded as continuously extending over the entire circumference of the vessel body 10 and along the plane (Y-Z plane) perpendicularly intersecting the dividing wall 50. It should be noted that the first connection rib 61b (first flow inlet 12) may be disposed on a portion of the vessel body 10 where no rib 60 is provided. In this case, the first rib 61 including only the first rib body 61a is made to continuously extend over the entire circumference of the vessel body 10. In other words, even in the case where the first rib 61 includes a cylindrical structural component such as the first connection rib 61b (first flow inlet 12), if the structural component has a function to reinforce the vessel body 10 similarly to the first rib body 61a, the first rib 61 including the structural component is regarded as continuously extending over the entire circumference of the vessel body 10 and along the plane (Y-Z plane) perpendicularly intersecting the dividing wall 50.

A third rib 63 positioned in the middle of the plurality of ribs 60, and a fifth rib 65 positioned at the other end of the plurality of ribs 60 are configured in a similar manner to the first rib 61. Specifically, the third rib 63 includes a third rib body 63a continuously extending in the circumferential direction of the vessel body 10, and a third connection rib 63b which allows the second chamber 10b to communicate with the outside and connects one end and the other end of the third rib body 63a. The third rib body 63a joins a circumferential surface of the third connection rib 63b. Consequently, the third rib 63 as a whole continuously extends over the entire circumference of the vessel body 10. The third connection rib 63b is in the form of a rectangular tube. The third connection rib 63b projects upward from the outer surface of the top wall 20. The third connection rib 63b has a flat top surface. The amount of projection of the third connection rib 63b from the outer surface of the top wall 20 is slightly greater than that of the third rib body 63a. An end of a pipe is connected to the top surface of the third connection rib 63b, the pipe being used for guiding gas discharged from the second compressor 102 or the like into the second chamber 10b. In other words, in the first embodiment, the third connection rib 63b functions as the second flow inlet 16. The third connection rib 63b reinforces the vessel body 10, similarly to the third rib body 63a. Therefore, in the first embodiment, the third rib 63 including the third connection rib 63b is regarded as continuously extending over the entire circumference of the vessel body 10 and along the plane (Y-Z plane) perpendicularly intersecting the dividing wall 50. It should be noted that the third connection rib 63b (second flow inlet 16) may be disposed on a portion of the vessel body 10 where no rib 60 is provided. In this case, the third rib 63 including only the third rib body 63a is made to continuously extend over the entire circumference of the vessel body 10.

The fifth rib 65 includes a fifth rib body 65a continuously extending in the circumferential direction of the vessel body 10, a fifth first chamber-side connection rib 65b which allows the first chamber 10a to communicate with the outside and connects mutually facing ends of the fifth rib body 65a, and a cylindrical fifth second chamber-side connection rib 65c which brings the second chamber 10b into communication with the outside and connects mutually facing ends of the fifth rib body 65a. The fifth rib body 65a joins a circumferential surface of the fifth first chamber-side connection rib 65b and a circumferential surface of the fifth second chamber-side connection rib 65c. Consequently, the fifth rib 65 as a whole continuously extends over the entire circumference of the vessel body 10. The fifth first chamber-side connection rib 65b includes the circumferential surface in the form of a rectangular tube and an inner surface in the form of a cylinder. The fifth first chamber-side connection rib 65b projects upward from the outer surface of the top wall 20. The fifth first chamber-side connection rib 65b has a flat top surface. The amount of projection of the fifth first chamber-side connection rib 65b from the outer surface of the top wall 20 is slightly greater than that of the fifth rib body 65a. An end of a pipe is connected to the top surface of the fifth first chamber-side connection rib 65b, the pipe being used for guiding gas flown out of the first chamber 10a into the second compressor 102 or the like. In other words, in the first embodiment, the fifth first chamber-side connection rib 65b functions as the first flow outlet 14. The fifth first chamber-side connection rib 65b reinforces the vessel body 10, similarly to the fifth rib body 65a. The fifth second chamber-side connection rib 65c includes the circumferential surface in the form of a rectangular tube and an inner surface in the form of a cylinder. The fifth second chamber-side connection rib 65c projects upward from an outer surface of a first facing wall 44. The fifth second chamber-side connection rib 65c has a flat side surface. The amount of projection of the fifth second chamber-side connection rib 65c from the outer surface of the first facing wall 44 is slightly greater than that of the fifth rib body 65a. An end of a pipe is connected to the side surface of the fifth second chamber-side connection rib 65c, the pipe being used for guiding gas flown out of the second chamber 10b to the outside. In other words, in the first embodiment, the fifth second chamber-side connection rib 65c functions as the second flow outlet 18. The fifth second chamber-side connection rib 65c reinforces the vessel body 10, similarly to the fifth rib body 65a. Therefore, in the first embodiment, the fifth rib 65 including the fifth first chamber-side connection rib 65b and the fifth second chamber-side connection rib 65c is regarded as continuously extending over the entire circumference of the vessel body 10 and along the plane (Y-Z plane) perpendicularly intersecting the dividing wall 50. It should be noted that the fifth first chamber-side connection rib 65b (first flow outlet 14) and the fifth second chamber-side connection rib 65c (second flow outlet 18) may each be disposed on a portion of the vessel body 10 where no rib 60 is provided. In this case, the fifth rib 65 including only the fifth rib body 65a is made to continuously extend over the entire circumference of the vessel body 10.

A second rib positioned between the first rib 61 and the third rib 63 includes a second rib body 62a, and a fourth rib positioned between the third rib 63 and the fifth rib 65 includes a fourth rib body 64a. All of the rib bodies 61a to 65a have the same amount of projection from the outer surface of the vessel body 10. Further, all of the rib bodies 61a to 65a have the same thickness (dimension in the X-axis direction).

As described above, in the first embodiment, portions of the vessel body 10 where great stress is liable to occur are reinforced by the plurality of ribs 60 having a relatively great reinforcing effect, i.e. the vessel body 10 is effectively reinforced. Therefore, it is possible to secure the strength while reducing the weight of the entire pressure vessel. Specifically, as in the first embodiment, in the pressure vessel which includes the vessel body 10 having a rectangular parallelepiped shape and the dividing wall 50 in the form of a plate and dividing the internal space of the vessel body 10 in half, the rib 60 extending along a plane perpendicularly intersecting the dividing wall 50 provides a greater effect of reinforcing the vessel body 10 than a rib extending along a plane extending in parallel to the dividing wall 50.

Further, when high pressure gas flows in each of the chambers 10a, 10b of the pressure vessel, loads act on the top wall 20, the bottom wall 30, and the surrounding wall 40 in directions to expand these walls respectively outward. As a result, the maximum stress occurs in the joining portions of the top wall 20 and the surrounding wall 40 and of the bottom wall 30 and the surrounding wall 40, and the second maximum stress occurs in a vertically middle portion (in the Z-axis direction) of the surrounding wall 40, following the joining portions. In the first embodiment, the plurality of ribs 60 are each disposed along, not a plane (X-Z plane) in parallel to the dividing wall 50, but a plane (Y-Z plane) perpendicularly intersecting the dividing wall 50. This improves the reinforcing effect of the vessel body 10 provided by the ribs 60 (the reducing effect of the stress that occurs in the vessel body 10 with respect to the weight of the ribs 60) compared to the case where these ribs are each disposed along a plane extending in parallel to the dividing wall 50. Furthermore, the ribs 60 each extend over the entire circumference of the vessel body 10 and along a plane perpendicularly intersecting the dividing wall 50. This allows effective reduction of the stress that occurs in the portions of the vessel body where the maximum stress is liable to occur, i.e. the joining portions, and the stress that occurs in the portion where the second maximum stress is liable to occur following the joining portions, i.e. the vertically middle portion of the surrounding wall 40. Therefore, it is possible to make the vessel body 10 thinner and, in turn, make the entire pressure vessel lighter.

Now, the relationship between the distance L (measurement in the X-axis direction) between adjacent ribs 60 and the reinforcing effect of the vessel body 10 provided by the ribs 60 will be discussed. More specifically, there will be discussed the relationship between the ratio L/H, i.e. the ratio of the distance L between adjacent ribs to the height H of the vessel body 10, and the reinforcing effect of the vessel body 10 provided by the ribs 60. In the first embodiment, because the chambers 10a and 10b have a height H greater than its width, a greater stress occurs in a vertically middle portion of each of the pair of facing walls 44 than on the respective flat portions of the top wall 30 and the bottom wall 40 that exclude the portions joining the dividing wall 50. Therefore, the reinforcing effect provided by the ribs 60 is more important for the pair of facing walls 44 than for the top wall 20 and the bottom wall 30. Accordingly, in the first embodiment, the height H of the vessel body 10 is used as a criterion for examining the reinforcing effect provided by the ribs 60. It should be noted that the distance L between adjacent ribs 60 is the measurement between the centers of the adjacent ribs 60 in its plate thickness direction (X-axis direction).

When the plurality of ribs 60 are placed in a specific region, and the ratio L/H is smaller than 0.27, the total number of ribs 60 is relatively large. Therefore, the total weight of the plurality of ribs 60 is relatively great with respect to the weight of the pressure vessel. Accordingly, although the strength of the vessel body 10 is high, the weight of the entire pressure vessel is too great. Thus, the reinforcing effect of the vessel body 10 provided by the plurality of ribs 60 per unit weight of the pressure vessel (hereinafter, referred to as "reinforcing performance indicator") is relatively small. In other words, when the ratio L/H is smaller than 0.27, the vessel body 10 is excessively reinforced by the plurality of ribs 60. On the contrary, when the ratio L/H is greater than 1.16, the total number of ribs 60 is relatively small. Therefore, the total weight of the plurality of ribs 60 is relatively small with respect to the weight of the pressure vessel. Accordingly, although the weight of the entire pressure vessel is small, the reinforcing effect of the vessel body 10 (the strength of the vessel body 10) provided by the ribs 60 is small. Thus, the reinforcing performance indicator is relatively small. In other words, when the ratio L/H is greater than 1.16, the vessel body 10 is insufficiently reinforced by the plurality of ribs 60.

Therefore, in the first embodiment, the ratio L/H is set in the range from 0.27 to 1.16. This allows the reinforcing performance indicator to be relatively high. In other words, when the ratio L/H is from 0.27 to 1.16, the reinforcing effect of the vessel body 10 provided by the plurality of ribs 60 per unit weight of the pressure vessel is relatively great. Accordingly, it is possible to make the vessel body 10 thinner, i.e. reduce the weight of the entire pressure vessel.

Further, the ratio L/H is preferred to be from 0.40 to 0.86. This allows the reinforcing performance indicator to be higher, which makes it possible to further reduce the weight of the pressure vessel.

Further, the ratio L/H is preferred to be set to 0.55. This allows the reinforcing performance indicator to be even higher, which makes it possible to even further reduce the weight of the pressure vessel.

Now, an example of the pressure vessel according to the first embodiment will be described.

<Example>

Figure 5:
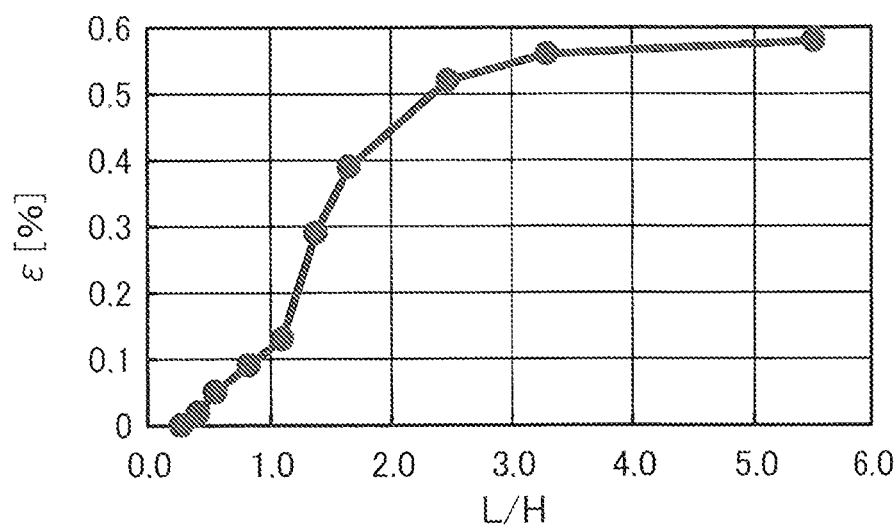
FIG. 5 is a graph showing a relationship between the ratio of the distance between adjacent ribs to the height of a vessel body and the maximum strain.

Maximum strains $\epsilon$ that occur in the vessel body 10 upon application of an internal pressure of 10.4 Mpa to the pressure vessel were analyzed in the range of the ratio L/H from 0.27 to 5.5. FIG. 5 shows the results. It should be noted that the maximum strain $\epsilon$ occurred at the joining portions of the top wall 20 and the surrounding wall 40 and of the bottom wall 30 and the surrounding wall 40, and the second maximum strain following the maximum strain $\epsilon$ occurred in the vertically middle portion of the surrounding wall 40. In the present example, the height H (dimension in the Z-axis direction) of the vessel body 10 is 364 mm, and the width (dimension in the Y-axis direction) of the vessel body 10 is 636 mm. Further, the amount of projection of each rib 60 from the vessel body 10 is 50 mm, and the thickness (in the X-axis direction) of each rib 60 is 25 mm.

FIG. 5 shows a graph of a curve with the maximum strain $\epsilon$ increasing as the ratio L/H increases, where ratios L/H are plotted on the horizontal axis and maximum strains $\epsilon$ are plotted on the vertical axis. In the present example, when the ratio L/H was 5.5, the maximum strain $\epsilon$ was 0.58%. This value is the same as the value of a maximum reference strain $\epsilon 0$ that occurs in the vessel body 10 when no rib 60 is provided on the outer surface of the vessel body 10. Thus, it was found that substantially no reinforcing effect of the vessel body 10 can be provided by the plurality of ribs 60 when the ratio L/H is 5.5.

Figure 6:
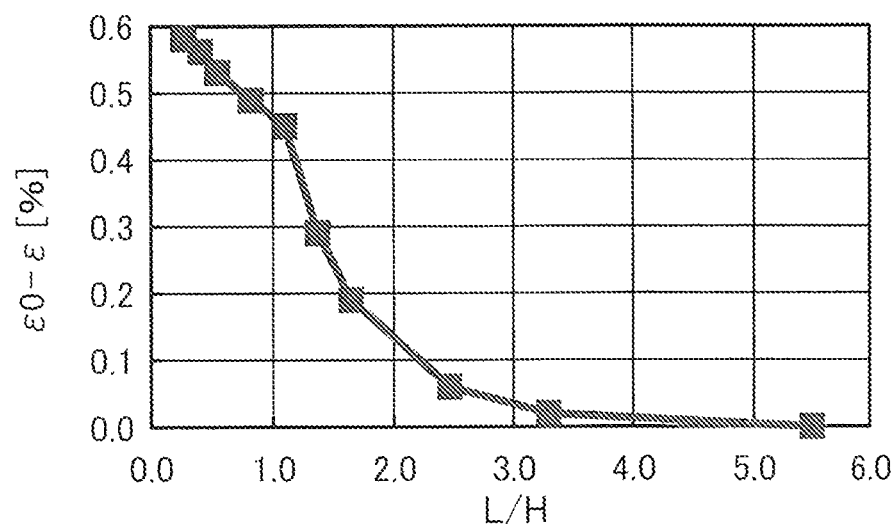
FIG. 6 is a graph showing a relationship between the ratio of the distance between adjacent ribs to the height of the vessel body and the value obtained by subtracting the maximum strain from a maximum reference strain.

FIG. 6 is a graph with the ratios L/H plotted on the horizontal axis and values each obtained by subtracting the maximum strain $\epsilon$ shown in FIG. 5 from the maximum reference strain $\epsilon 0$ (0.58%) plotted on the vertical axis. Thus, FIG. 6 is a graph indicating extents to which the vessel body 10 is permitted to further distort, i.e. permissible amounts to the maximum strains $\epsilon$.

Figure 7:
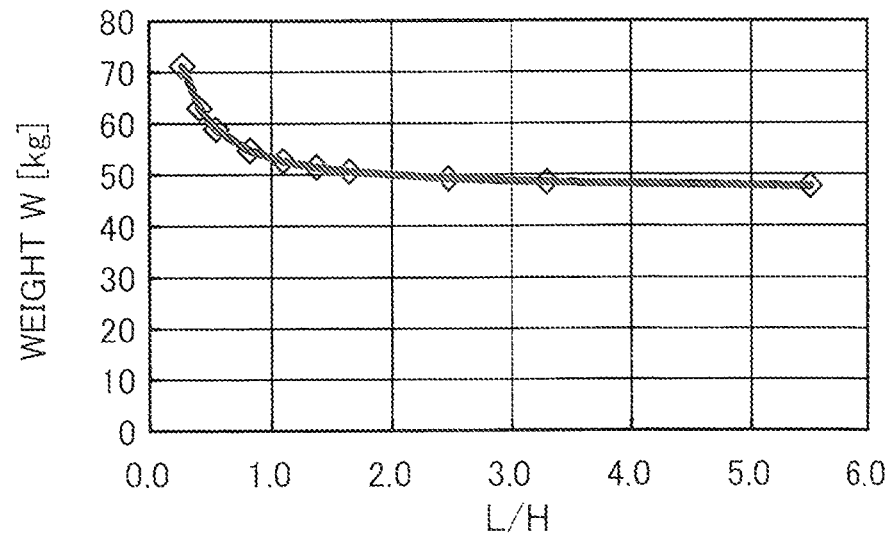
FIG. 7 is a graph showing a relationship between the ratio of the distance between adjacent ribs to the height of the vessel body and the weight of the pressure vessel.

FIG. 7 is a graph with the ratios L/H plotted on the horizontal axis and weights of the pressure vessel plotted on the vertical axis. Because the total number of ribs 60 decreases as the ratio L/H increases, FIG. 7 shows a curve with the weight decreasing as the ratio L/H increases.

Figure 8:
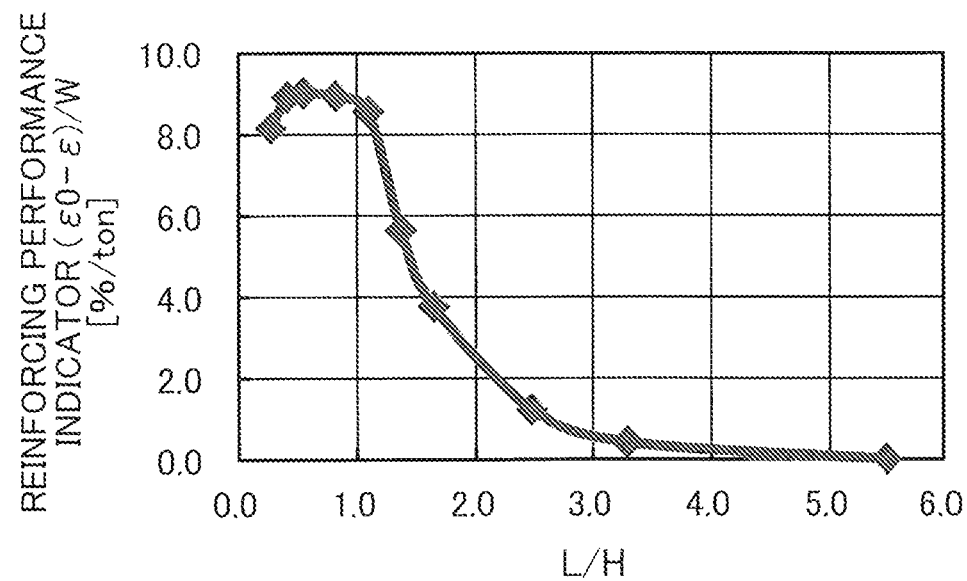
FIG. 8 is a graph showing a relationship between the ratio of the distance between adjacent ribs to the height of the vessel body and the reinforcing performance indicator.

FIG. 8 is a graph with the ratios L/H plotted on the horizontal axis, and values each obtained by dividing the value (obtained by subtracting the maximum strain $\epsilon$ from the maximum reference strain $\epsilon 0$) on the vertical axis of FIG. 6 by the corresponding value (weight W of the pressure vessel) on the vertical axis of FIG. 7 plotted on the vertical axis. The values on the vertical axis of FIG. 8 each indicate a permissible amount to the maximum strain $\epsilon$ per unit weight of the pressure vessel. Thus, greater values indicate greater reinforcing effects of the vessel body 10 per unit weight of the pressure vessel provided by the plurality of ribs 60. In other words, the values on the vertical axis of FIG. 8 correspond to the reinforcing performance indicators. When the value is relatively great, the vessel body 10 is effectively reinforced and the pressure vessel is lightened. The graph shown in FIG. 8 is a curve projecting upward and, therefore, there is an optimum point.

Figure 9:
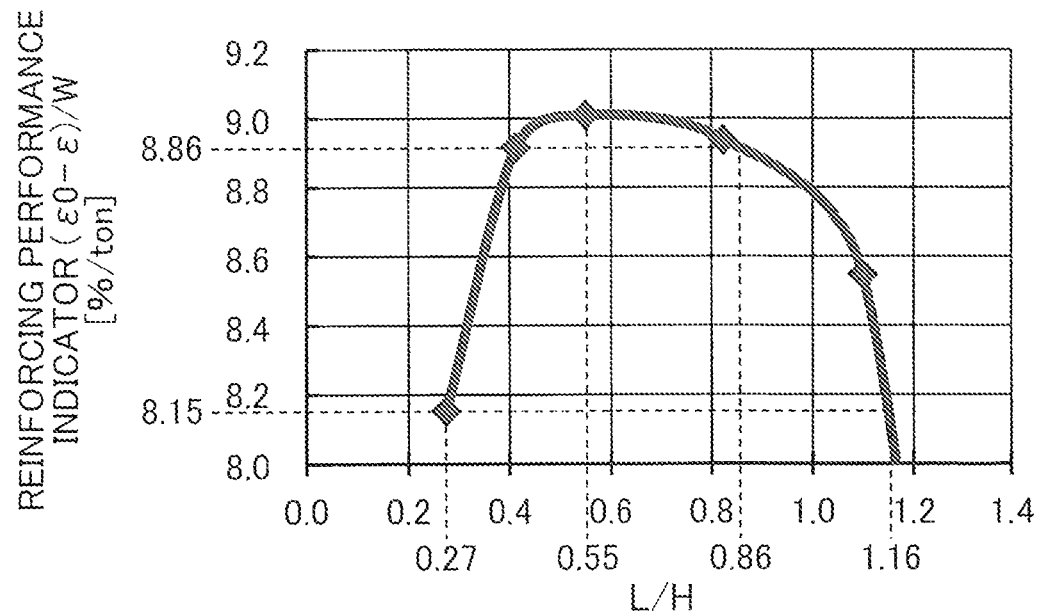
FIG. 9 is an enlarged graph of a portion of the graph shown in FIG. 8.

FIG. 9 is an enlarged graph of a portion around the optimum point of the graph shown in FIG. 8. It is seen from FIG. 9 when the ratio L/H is from 0.27 to 1.16, the value of the reinforcing performance indicator is relatively great, i.e. equal to or greater than 8.15, and therefore, both effective reinforcement of the vessel body 10 and weight reduction of the pressure vessel can be achieved.

Further, it is seen from FIG. 9 that the ratio L/H is preferred to be from 0.40 to 0.86. In this range, the reinforcing performance indicator is equal to or more than 8.86. Therefore, it is possible to make each wall of the vessel body 10 thinner, i.e. make the pressure vessel lighter.

Further, it is seen from FIG. 9 that when the ratio L/H is 0.55, the reinforcing performance indicator reaches a maximum value of 9.0.

It should be noted that the embodiment described above is exemplary in all respects and should not be regarded as restrictive. The scope of the present invention is indicated by the scope of the claims and not by the description given above, and includes all modifications within the same sense and scope as the claims.

For example, the plurality of ribs 60 may alternatively be configured as shown in a first modified example and a second modified example described below.

<First Modified Example>

The first modified example of the above-described first embodiment will be described with reference to FIGS. 10 and 11. The first modified example includes the same structures as those of the above-described embodiment except for the shapes of a plurality of ribs 60.

Figure 10:
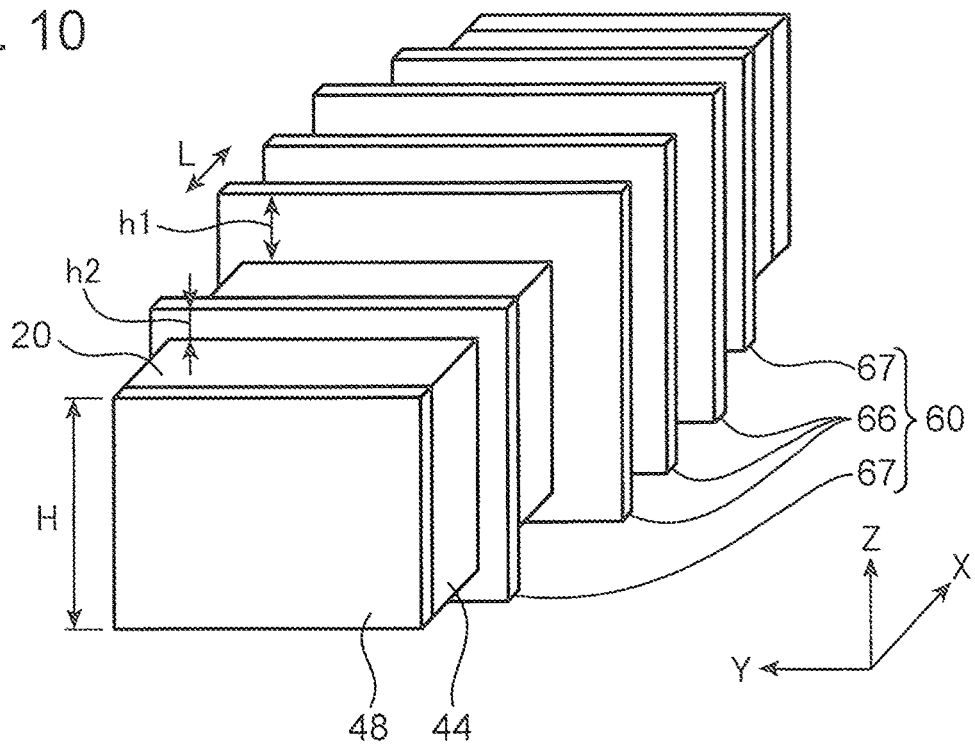
FIG. 10 is a perspective view of a first modified example of the pressure vessel shown in FIG. 1.
Figure 11:
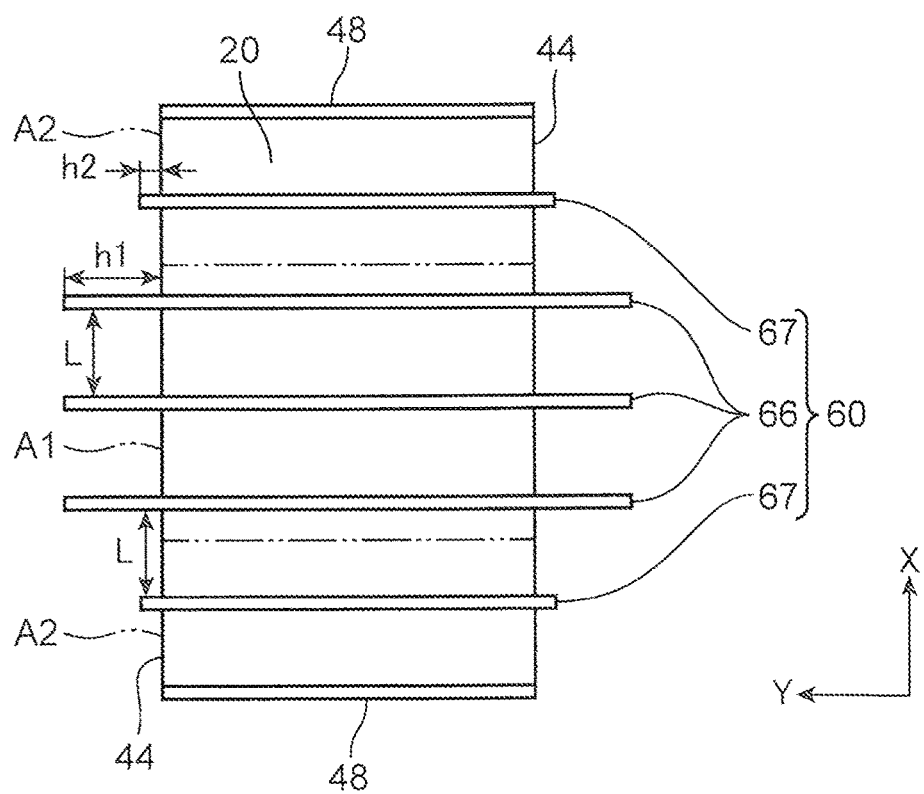
FIG. 11 is a plan view of the pressure vessel shown in FIG. 10.

As shown in FIGS. 10 and 11, the plurality of ribs 60 include a plurality of central ribs 66 disposed in a central region A1, and a plurality of outer ribs 67 disposed in outer regions A2. The central region A1 is located in the center of the outer surface of the vessel body 10 in an arrangement direction (X-axis direction) of the ribs, and occupies half of the total area of the four walls (the top wall 20, the pair of first facing walls 44, and the bottom wall) of the vessel body 10 that are arranged in the circumferential direction along the plane perpendicularly intersecting the dividing wall 50. The outer regions A2 are respectively located on both sides of the central region A1 on the outer surface of the vessel body 10 in the arrangement direction.

In this modified example, three central ribs 66 is provided in the central region A1, and one outer rib 67 is provided in each outer region A2.

The amount of projection h2 of each outer rib 67 from the outer surface of the vessel body 10 is smaller than the amount of projection h1 of each central rib 66 from the outer surface of the vessel body 10. This is because upon application of internal pressure to each of the chambers 10a, 10b, a greater stress occurs in the central region A1 than on the outer regions A2 of the vessel body 10.

In this modified example, the total weight of the plurality of ribs 60 is reduced as compared to a case where a plurality of central ribs 66 are arranged at regular intervals in the arrangement direction. Therefore, it is possible to reduce the weight of the entire pressure vessel while securing the strength.

It should be noted that although in this modified example, the amount of projection of the outer rib 67 from the outer surface of the vessel body 10 is smaller than that of the central rib 66, this is not the only configuration. For example, it may be configured such that all the ribs have the same amount of projection from the outer surface of the vessel body 10, and the outer ribs 67 have a smaller thickness than the central ribs 66. Also in this case, the above-mentioned advantageous effects can be similarly obtained.

<Second Modified Example>

The second modified example of the above-described first embodiment will be described with reference to FIG. 12. The second modified example also includes the same structures as those of the above-described embodiment except for the shapes of a plurality of ribs 60.

Figure 12:
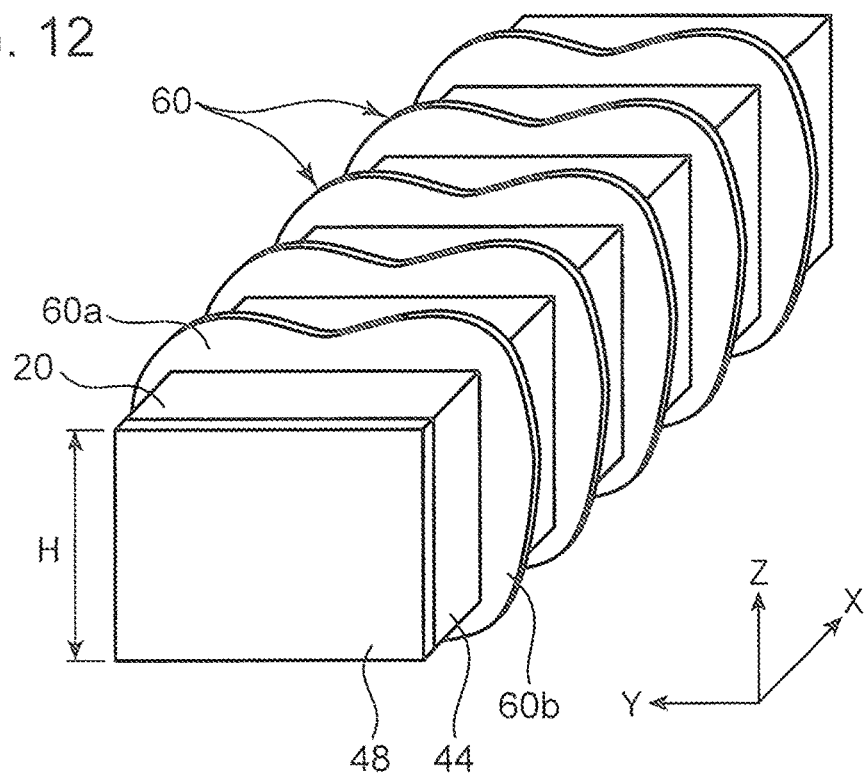
FIG. 12 is a perspective view of a second modified example of the pressure vessel shown in FIG. 1

As shown in FIG. 12, each rib 60 includes first sections 60a respectively disposed on the outer surface of the top wall 20 and the outer surface of the bottom wall 30, and second sections 60b respectively disposed on the outer surfaces of the pair of first facing walls 44.

Each of the first sections 60a is shaped in such a way that the amount of projection gradually increases and then decreases outward from the portion of the top wall 20 or the bottom wall 30 that overlaps the dividing wall 50 in the plate thickness direction (Z-axis direction). This is because upon application of internal pressure to each of the chambers 10a, 10b, the stresses that occur in the top wall 20 and the bottom wall 30 gradually increase outward from the respective portions of the top wall 20 and the bottom wall 30 that join the dividing wall 50.

Each of the second sections 60b is shaped in such a way that the amount of projection gradually increases from the joining portion of the top wall 20 and the surrounding wall 40 or the joining portion of the bottom wall 30 and the surrounding wall 40 to the vertically middle portion of the first facing wall 44. This is because upon application of internal pressure to each of the chambers 10a, 10b, the stresses that occur in the first facing walls 44 increase from each joining portion to the respective middle portions of the first facing walls 44. It should be noted that the maximum stress occurs in the joining portions.

In this modified example, the total weight of the plurality of ribs 60 is reduced as compared to a case where each rib 60 is shaped in such a way that the amount of projection from the outer surface of the vessel body 60 is uniformly equal to the maximum amount of the first sections 60a or the maximum amount of the second sections 60b over the entire circumference of the vessel body 10. Therefore, it is possible to reduce the weight of the entire pressure vessel while securing the strength.

Second Embodiment

Now a pressure vessel according to a second embodiment of the present invention will be described with reference to FIGS. 13 and 14. The second embodiment includes the same structures as those of the first embodiment except for the arrangement of the plurality of ribs 60.

Figure 13:
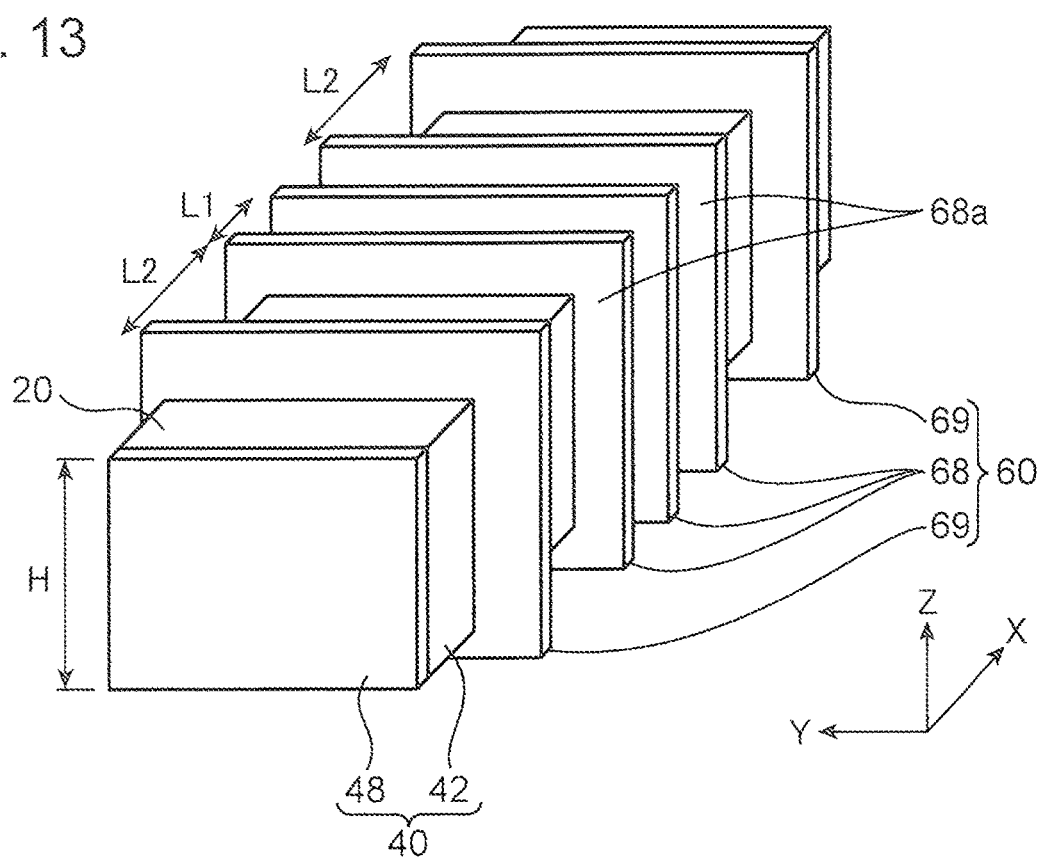
FIG. 13 is a perspective view of a pressure vessel according to a second embodiment of the present invention.
Figure 14:
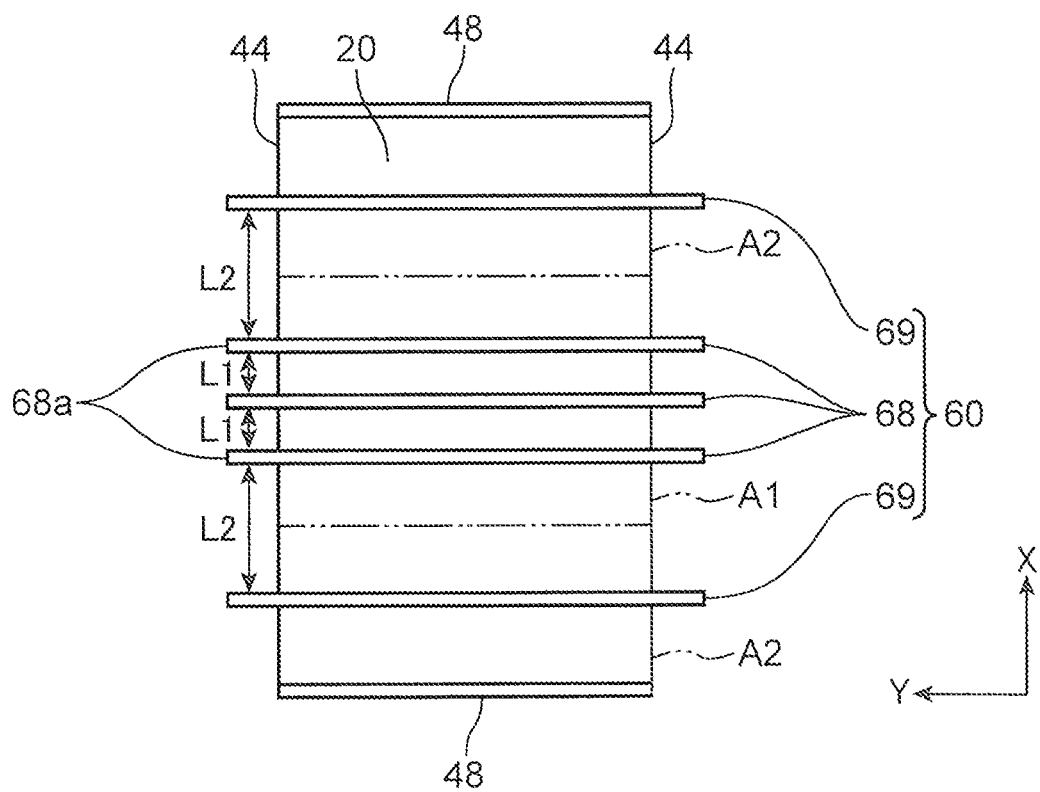
FIG. 14 is a plan view of the pressure vessel shown in FIG. 13.

As shown in FIGS. 13 and 14, the plurality of ribs 60 include a plurality of primary ribs 68 disposed in the central region A1, and a plurality of secondary ribs 69 disposed in the outer regions A2.

The plurality of primary ribs 68 are arranged at regular intervals in the arrangement direction. In the second embodiment, three primary ribs 38 are provided in the central region A1.

Each secondary rib 69 is disposed outside an outermost primary rib 68a among the plurality of primary ribs 68 in the arrangement direction and at a position away from the outermost rib 68a by a distance L2 that is greater than a distance L1 between adjacent primary ribs 68. In the second embodiment, one secondary rib 69 is provided in each outer region A2.

In the second embodiment, the pressure vessel is further lightened while securing a necessary strength. Specifically, the central region A1 of the vessel body 10 has a tendency of expanding outward to a greater extent than the outer regions A2 upon application of internal pressure to each of the chambers 10a, 10b. Therefore, while a relatively great stress occurs in the central region A1, only a relatively small stress occurs in each outer region A2. Thus, by reinforcing the central region A1 by the relatively densely arranged plurality of primary ribs 68 while reinforcing the outer regions A2 by the secondary ribs 69 that are arranged less densely than the plurality of primary ribs 68, the pressure vessel is lightened as compared to a case where the plurality of primary ribs 68 are arranged at regular intervals over the entire outer surface of the vessel body 10 in the arrangement direction.

It should be noted that also in the second embodiment, each secondary rib 69 may be made to have a smaller amount of projection from the outer surface of the vessel body 10 than the plurality of primary ribs 68 as in the above-described first modified example. Further, each rib may be made to include first sections 60a and second sections 60b as in the above-described second modified example.

The above-described embodiments are summarized below.

The present pressure vessel comprises: a vessel body having a rectangular parallelepiped shape and adapted for containing high pressure gas; a dividing wall in the form of a plate and disposed in the vessel body; and a plurality of ribs disposed on an outer surface of the vessel body, wherein the vessel body includes a top wall having a rectangular shape, a bottom wall having a rectangular shape and facing the top wall, and a surrounding wall in the form of a rectangular tube and joining a peripheral edge of the top wall and a peripheral edge of the bottom wall, the dividing wall is disposed in the vessel body in such a way as to define a first chamber having a rectangular parallelepiped shape and a second chamber having a rectangular parallelepiped shape in cooperation with the vessel body, and each of the plurality of ribs extends over an entire circumference of the vessel body and along a plane perpendicularly intersecting the dividing wall.

In the present pressure vessel, portions of the vessel body where great stress is liable to occur are reinforced by the plurality of ribs having a relatively great reinforcing effect, i.e. the vessel body is effectively reinforced. Therefore, it is possible to secure the strength while reducing the weight of the entire pressure vessel. Specifically, the plurality of ribs are disposed along, not the plane extending in parallel to the dividing wall, but the plane perpendicularly intersecting the dividing wall. This improves the reinforcing effect of the vessel body provided by the ribs (the reducing effect of the stress that occurs in the vessel body with respect to the weight of the ribs) as compared to the case where the ribs are disposed along the plane extending in parallel to the dividing wall. Furthermore, these ribs extend over the entire circumference of the vessel body and along the plane perpendicularly intersecting the dividing wall. This allows effective reduction of the stress that occurs in the portions of the vessel body where the maximum stress is liable to occur, i.e. the joining portions of the two walls (such as the top wall and the surrounding wall) that perpendicularly intersect the plane perpendicularly intersecting the dividing wall and are adjacent to each other, and effective reduction of the stress that occurs in the portions where the second maximum stress is liable to occur following the joining portions, i.e. the middle portions of the walls of the vessel body that extend in parallel to the dividing wall. Therefore, it is possible to make the vessel body thinner and, in turn, make the entire pressure vessel lighter.

Specifically, the dividing wall is preferred to extend in a direction perpendicularly intersecting the top wall and the bottom wall and join an inner surface of the top wall and an inner surface of the bottom wall.

This configuration allows the chambers to be adjacent to each other in a horizontal direction when the bottom wall is placed on a horizontal surface, which is advantageous when the vertical installation space for the pressure vessel is limited.

In this case, the plurality of ribs are preferred to be disposed along a plane perpendicularly intersecting both the top wall and the dividing wall.

This configuration makes it possible to form, in portions of the outer surface of the surrounding wall where no ribs are disposed, openings for respectively allowing devices (such as heat exchangers) to be accommodated in the chambers.

Further, in the present invention, it is preferred that the plurality of ribs include a plurality of primary ribs arranged at a regular interval in a direction parallel to the dividing wall, and a ratio of the distance between adjacent primary ribs of the plurality of primary ribs to the height of the surrounding wall is from 0.27 to 1.16.

This configuration allows the reinforcing effect (reinforcing performance indicator) of the vessel body provided by the plurality of primary ribs per unit weight of the pressure vessel to be relatively great. Specifically, when the plurality of primary ribs are disposed in a specific region in the direction in parallel to the dividing wall (the arrangement direction of the plurality of ribs), and the ratio is smaller than 0.27, the total number of primary ribs is relatively large. Therefore, the total weight of the plurality of primary ribs is relatively great with respect to the weight of the pressure vessel. Accordingly, although the strength of the vessel body is high, the weight of the entire pressure vessel is too great. Thus, the reinforcing performance indicator is relatively small. In other words, when the ratio is smaller than 0.27, the vessel body is excessively reinforced by the plurality of primary ribs. On the contrary, when the ratio is greater than 1.16, the number of primary ribs is relatively small. Therefore, the total weight of the plurality of primary ribs is relatively small with respect to the weight of the pressure vessel. Accordingly, although the weight of the entire pressure vessel is small, the reinforcing effect of the vessel body (the strength of the vessel body) provided by the primary ribs is too small. Thus, the reinforcing performance indicator is relatively small. In other words, when the ratio is greater than 1.16, the vessel body is insufficiently reinforced by the plurality of primary ribs. In the present pressure vessel, the ratio is set in the range from 0.27 to 1.16. This allows the reinforcing performance indicator to be relatively high. In other words, in the present pressure vessel, because the primary ribs provide a relatively great reinforcing effect of the vessel body, it is possible to make the vessel body thinner, i.e. reduce the weight of the entire pressure vessel.

In this case, it is preferred that the ratio is from 0.40 to 0.86.

This configuration further increases the reinforcing performance indicator. Therefore, it is possible to further reduce the weight of the pressure vessel.

Further, in this case, it is preferred that the ratio is 0.55.

This configuration even further increases the reinforcing performance indicator. Therefore, it is possible to even further reduce the weight of the pressure vessel.

Further, it is preferred that: the plurality of ribs further include a secondary rib disposed outside an outermost primary rib among the plurality of primary ribs in the arrangement direction of the plurality of primary ribs and at a distance from the outermost primary rib greater than the distance between the adjacent primary ribs; the plurality of primary ribs are disposed in a central region including a center of the outer surface of the vessel body in the arrangement direction; and the secondary rib is disposed in an outer region lying outside the central region of the outer surface of the vessel body in the arrangement direction.

This configuration allows further weight reduction of the pressure vessel while securing a necessary strength. Specifically, the central region of the vessel body has a tendency of expanding outward to a greater extent than the outer region upon application of internal pressure to each chamber. Therefore, while a relatively great stress occurs in the central region, only a relatively small stress occurs in the outer region. Thus, by reinforcing the central region by the relatively densely arranged plurality of primary ribs while reinforcing the outer region by the secondary rib arranged less densely than the plurality of primary ribs, the pressure vessel is lightened as compared to a case where the plurality of primary ribs are arranged at regular intervals over the entire outer surface of the vessel body in the arrangement direction.

The invention claimed is:

1. A pressure vessel, comprising:
   a vessel body having a rectangular parallelepiped shape and adapted for containing high pressure gas;
   a dividing wall in the form of a plate and disposed in the vessel body; and
   a plurality of ribs disposed on an outer surface of the vessel body, wherein
   the vessel body includes
      a top wall having a rectangular shape,
      a bottom wall having a rectangular shape and facing the top wall, and
      a surrounding wall in the form of a rectangular tube and joining a peripheral edge of the top wall and a peripheral edge of the bottom wall,
   the dividing wall is disposed in the vessel body in such a way as to define a first chamber having a rectangular parallelepiped shape and a second chamber having a rectangular parallelepiped shape in cooperation with the vessel body,
   each of the plurality of ribs extends over an entire circumference of the vessel body and along a plane perpendicularly intersecting the dividing wall, the plurality of ribs include a plurality of primary ribs arranged at a regular interval in a direction parallel to the dividing wall, a ratio of the distance between adjacent primary ribs of the plurality of primary ribs to the height of the surrounding wall is from 0.27 to 1.16, the plurality of ribs further include a secondary rib disposed outside an outermost primary rib among the plurality of primary ribs in the arrangement direction of the plurality of primary ribs and at a distance from the outermost primary rib greater than the distance between the adjacent primary ribs, the plurality of primary ribs are disposed in a central region including a center of the outer surface of the vessel body in the arrangement direction, and the secondary rib is disposed in an outer region lying outside the central region of the outer surface of the vessel body in the arrangement direction.

2. The pressure vessel according to claim 1, wherein the ratio is from 0.40 to 0.86.

3. The pressure vessel according to claim 2, wherein the ratio is 0.55.

4. A pressure vessel, comprising:
a vessel body having a rectangular parallelepiped shape and configured to contain high pressure gas;
a dividing wall in the form of a plate and disposed in the vessel body; and
a plurality of ribs disposed on an outer surface of the vessel body, wherein
the vessel body includes
 a top wall having a rectangular shape,
 a bottom wall having a rectangular shape and facing the top wall, and
 a surrounding wall in the form of a rectangular tube and joining a peripheral edge of the top wall and a peripheral edge of the bottom wall,
the dividing wall is disposed in the vessel body in such a way as to define a first chamber having a rectangular parallelepiped shape and a second chamber having a rectangular parallelepiped shape in cooperation with the vessel body,
each of the plurality of ribs extends over an entire circumference of the vessel body and along a plane perpendicularly intersecting the dividing wall, and
at least one of the plurality of ribs includes a rib body continuously extending in a circumferential direction of the vessel body, and a connection rib connected to the rib body and shaped in the form of a tube having a space which allows an internal space of the vessel body to communicate with an outside space of the vessel body.

5. A pressure vessel, comprising:
a vessel body having a rectangular parallelepiped shape and adapted for containing high pressure gas;
a dividing wall in the form of a plate and disposed in the vessel body; and
a plurality of ribs disposed on an outer surface of the vessel body, wherein
the vessel body includes
 a top wall having a rectangular shape,
 a bottom wall having a rectangular shape and facing the top wall, and
 a surrounding wall in the form of a rectangular tube and joining a peripheral edge of the top wall and a peripheral edge of the bottom wall,
the dividing wall is disposed in the vessel body in such a way as to define a first chamber having a rectangular parallelepiped shape and a second chamber having a rectangular parallelepiped shape in cooperation with the vessel body,
each of the plurality of ribs extends over an entire circumference of the vessel body and along a plane perpendicularly intersecting the dividing wall,
the plurality of ribs include a plurality of primary ribs arranged at a regular interval in a direction parallel to the dividing wall,
a ratio of the distance between adjacent primary ribs of the plurality of primary ribs to the height of the surrounding wall is from 0.27 to 1.16, and
at least one of the plurality of ribs includes a rib body continuously extending in a circumferential direction of the vessel body, and a connection rib connected to the rib body and shaped in the form of a tube having a space which allows an internal space of the vessel body to communicate with an outside space of the vessel body.

6. A pressure vessel, comprising:
a vessel body having a rectangular parallelepiped shape and adapted for containing high pressure gas;
a dividing wall in the form of a plate and disposed in the vessel body; and
a plurality of ribs disposed on an outer surface of the vessel body, wherein
the vessel body includes
 a top wall having a rectangular shape,
 a bottom wall having a rectangular shape and facing the top wall, and
 a surrounding wall in the form of a rectangular tube and joining a peripheral edge of the top wall and a peripheral edge of the bottom wall,
the dividing wall is disposed in the vessel body in such a way as to define a first chamber having a rectangular parallelepiped shape and a second chamber having a rectangular parallelepiped shape in cooperation with the vessel body,
each of the plurality of ribs extends over an entire circumference of the vessel body and along a plane perpendicularly intersecting the dividing wall,
the plurality of ribs include a plurality of primary ribs arranged at a regular interval in a direction parallel to the dividing wall,
a ratio of the distance between adjacent primary ribs of the plurality of primary ribs to the height of the surrounding wall is from 0.27 to 1.16,
the plurality of ribs includes the plurality of primary ribs and a plurality of secondary ribs, the primary ribs being disposed in a central region amongst the plurality of ribs, and
an interval between adjacent primary ribs is smaller than an interval between one of the primary ribs and a secondary rib that is adjacent to the one of the primary ribs.

7. A pressure vessel, comprising:
a vessel body having a rectangular parallelepiped shape and adapted for containing high pressure gas;
a dividing wall in the form of a plate and disposed in the vessel body; and
a plurality of ribs disposed on an outer surface of the vessel body, wherein
the vessel body includes
 a top wall having a rectangular shape,
 a bottom wall having a rectangular shape and facing the top wall, and a surrounding wall in the form of a rectangular tube and joining a peripheral edge of the top wall and a peripheral edge of the bottom wall, the dividing wall is disposed in the vessel body in such a way as to define a first chamber having a rectangular parallelepiped shape and a second chamber having a rectangular parallelepiped shape in cooperation with the vessel body, each of the plurality of ribs extends over an entire circumference of the vessel body and along a plane perpendicularly intersecting the dividing wall, the plurality of ribs include a plurality of primary ribs arranged at a regular interval in a direction parallel to the dividing wall, a ratio of the distance between adjacent primary ribs of the plurality of primary ribs to the height of the surrounding wall is from 0.27 to 1.16, the plurality of ribs includes the plurality of primary ribs and a plurality of secondary ribs, and each secondary rib has a projection from the outer surface of the vessel body that is smaller than a projection from the outer surface of the vessel body of each primary rib.

* * * * *